March 13, 1962 W. U. HYDE ETAL 3,024,823
DEVICE FOR RICING COOKED POTATOES AND THE LIKE
Filed Jan. 24, 1959 3 Sheets-Sheet 1

INVENTORS
WISTER U. HYDE
JAMES CORDING, JR.

BY
R. Hoffman
ATTORNEY

March 13, 1962 W. U. HYDE ETAL 3,024,823
DEVICE FOR RICING COOKED POTATOES AND THE LIKE
Filed Jan. 24, 1958 3 Sheets-Sheet 2

INVENTORS
WISTER U. HYDE
JAMES CORDING, JR.

BY *R. Hoffman*
ATTORNEY

March 13, 1962  W. U. HYDE ETAL  3,024,823
DEVICE FOR RICING COOKED POTATOES AND THE LIKE
Filed Jan. 24, 1958  3 Sheets-Sheet 3

INVENTORS
WISTER U. HYDE
JAMES CORDING, JR.

BY  *R. Hoffman*
ATTORNEY

United States Patent Office
3,024,823
Patented Mar. 13, 1962

3,024,823
DEVICE FOR RICING COOKED POTATOES
AND THE LIKE
Wister U. Hyde, Cheltenham, and James Cording, Jr., Philadelphia, Pa., assignors to the United States of America as represented by the Secretary of Agriculture
Filed Jan. 24, 1958, Ser. No. 711,108
1 Claim. (Cl. 146—174)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to apparatus for ricing cooked vegetables. In particular this invention relates to apparatus for ricing cooked vegetables such as potatoes with minimum destruction of individual cells.

Quality standards for mashed potatoes emphasize mealiness, that is, a non-pasty texture, in addition to other characteristics such as color and flavor. Potato cells are essentially envelopes containing starch. If the cell walls are broken the starch is liberated and contributes a pasty consistency to the mashed potatoes. Hence, a minimum of cell rupture is prerequisite to high quality mashed potatoes.

Cooked potato cells can withstand a considerable amount of compression without rupture. They cannot, however, withstand a shearing or "wiping" action. Yet prior to this invention the equipment used for large scale production of riced and mashed potatoes suffered the disadvantage of subjecting significant proportions of the potato cells to a shearing action, thereby releasing appreciable amounts of undesirable free starch in the product.

The apparatus of the present invention minimizes or, for all practical purposes, eliminates cell damage in ricing potatoes, thereby overcoming the serious defects of a starchy product especially as when riced potatoes are dried and then reconstituted, as in the commercial production of dehydrated mashed potatoes.

The advantages of the present invention reside in the novel features of construction, arrangement, and combination of parts which will be described with reference to the accompanying drawings of the apparatus in which.

The apparatus comprises a perforated rotating cylinder 1, a number of solid rolls 2 and 3 rotating at an adjustable fixed clearance therefrom, a helical conveyor 4 rotating within the perforated cylinder, suitable means of support as end plates 13 and 14, and means of driving the moving parts, as indicated.

Figure 5:
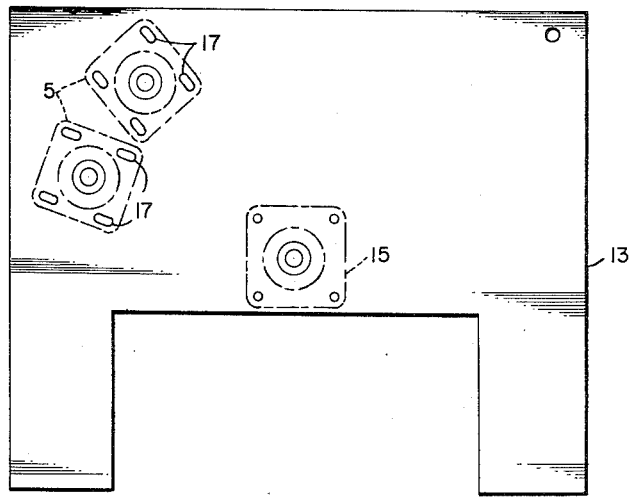
FIGURE 5 is a view of the end opposite to that shown in FIGURE 4.
Figure 1:
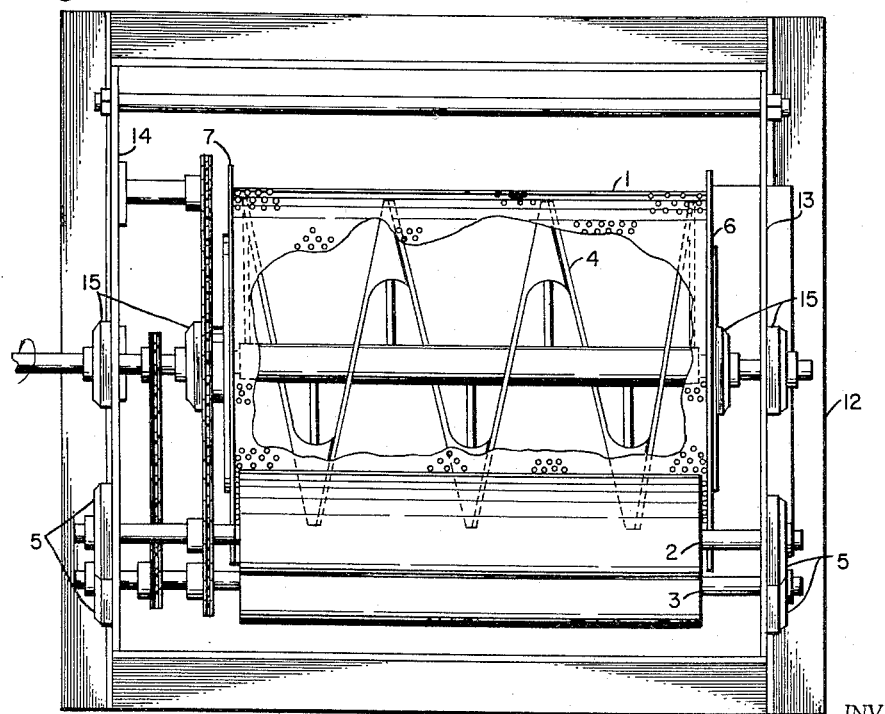
FIGURE 1 is a top view of the apparatus, partly in section, showing the internal screw conveyor.
Figure 4:
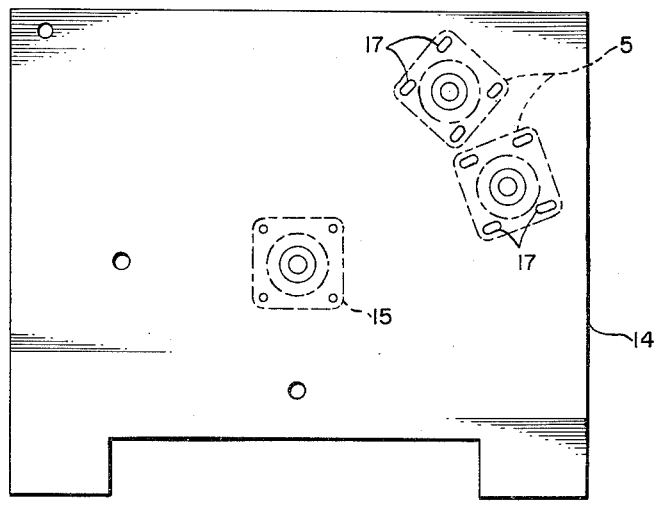
FIGURE 4 shows the cover for the end of FIGURE 3 and means for mounting the shaft bearings.
Figure 2:
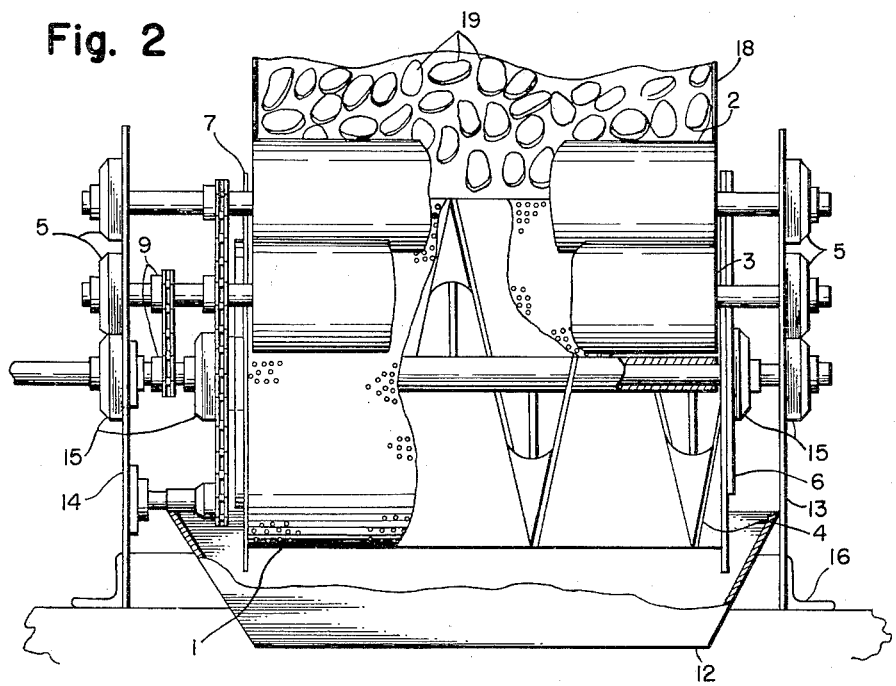
FIGURE 2 is a side elevation, partly in section, showing pieces of potato being fed to the apparatus.
Figure 3:
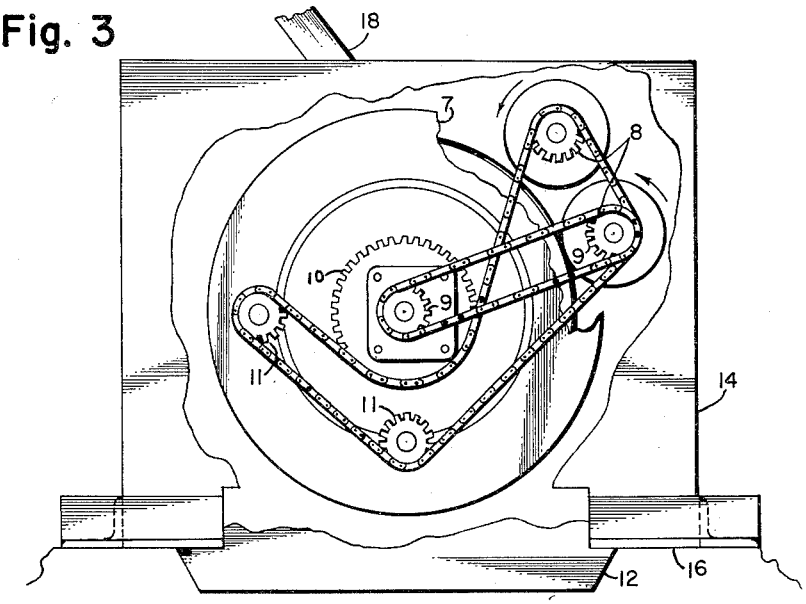
FIGURE 3 is an end view of the sealed and showing how the cylinder, rolls, and internal screw conveyor are driven.
Figure 6:
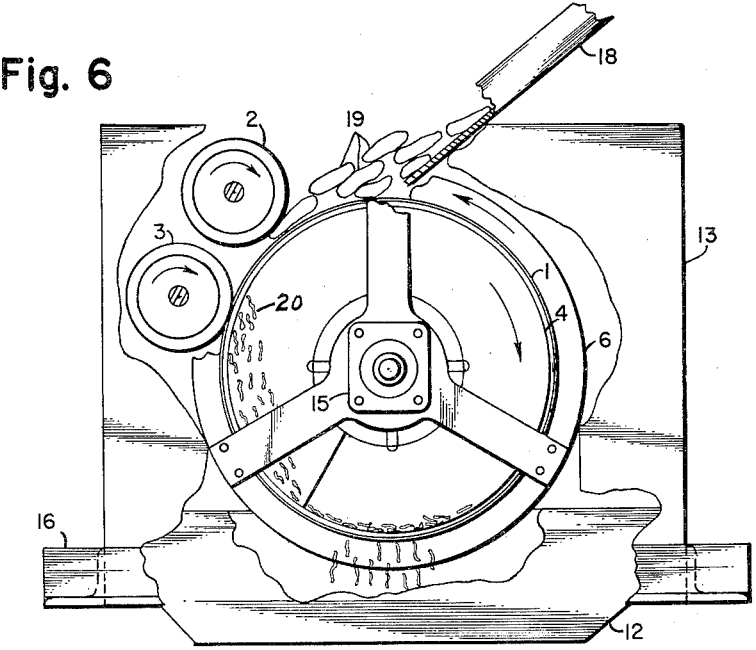
FIGURE 6 shows the discharge end of the apparatus with its cover removed.

In the operation of the apparatus the cylinder 1, preferably made of stainless steel or other material non-contaminating to cooked vegetables, and containing a plurality of perforations of diameters in the range of ⅛ to 5/16 inch, preferably about 3/16 to ¼ inch in diameter, and the rolls 2 and 3, whose surfaces are wood, plastic, stainless steel or other non-contaminating materials, rotate in opposite directions, as indicated in FIGURE 6, and at essentially the same peripheral speed to prevent shearing action. Pieces of cooked vegetables 19 are fed into the apparatus from hopper 18. The first roll 2 contacted by the pieces of cooked vegetables is set at a clearance sufficiently less than the thickness of said pieces so that they are lightly (barely) crushed by compression against the grid of the perforated cylinder, while the second roll 3 essentially contacts the cylinder so that the crushed vegetable is squeezed through the perforations, whereupon the riced vegetable 20 (FIGURE 6) is discharged from the inside of the cylinder by a helical conveyor 4 rotating in a direction opposite to, and at a speed somewhat in excess of that of the cylinder 1, the conveyor having a clearance of at least 1/16 inch with the cylinder to prevent rupture of vegetable cells by shearing action.

The perforated cylinder 1 terminates at each end in circular flanges 6 and 7 whose outside diameters are larger than that of the cylinder and the function of which is to stiffen the cylinder and to prevent the vegetables being riced from overflowing the ends. The preferred construction of the end flanges is that they have the maximum diameter that does not interfere with adjustment of the axles of the rollers 2 and 3. To prevent spillage of the riced vegetable, and to simplify driving the cylinder and attaching sprocket 10, flange 7 is a solid disc. To allow discharge of the riced vegetable from the other end of the cylinder, flange 6 is a ring supported by a spider on which is mounted cylinder bearing 15. The helical conveyor is fixed to the drive shaft which is supported by and rotates in bearing 15 attached to end plates 13 and 14. To drive the hardwood rollers 2 and 3 in the same direction as the conveyor sprockets 9 are attached to the drive shaft and to the shaft of roller 3. Roller 2 is driven from roller 3 by sprockets 8. The same chain that drives roller 2 also drives the cylinder in a reverse direction by use of cylinder drive sprocket 10 and idler sprockets 11. The relative sizes of the sprockets are calculated to impart the same peripheral speed to the rollers 2 and 3 and the perforated cylinder 1.

By the nature of this arrangement of sprockets, the cylinder rotates at a slower speed than the helical conveyor. The helical conveyor does not need to turn as rapidly as the cylinder to remove the riced vegetable, yet the conveyor could revolve more rapidly than it does and not damage the vegetable, hence the present arrangement is considered satisfactory.

Clearances between the rollers and the cylinder are adjustable by means of slots 17 in bearings 5 and in the end plates 13 and 14. While the drawing shows a two-roller construction, a series of three or more rollers may be used to advantage, especially with vegetables less frangible than cooked potatoes. The use of more than two rollers is considered especially advantageous when ricing whole vegetables. The clearance between the rollers and the perforated cylinder may be adjusted for whole vegetables, adhering to the principles of the first roller (as roller 2) being set for slightly less clearance than the thickness of the vegetable, succeeding rollers having less clearance, and the last roller essentially contacting the perforated cylinder.

The operation of the present invention is further illustrated by the following examples.

*Example 1*

Cooked potato slices, machine-cut to a uniform thickness of about ⅝ inch were fed on to the outer surface of the perforated cylinder so that the slices moved towards and under the first roller. This roller was set for about ½ inch clearance between the cylinder and the roller. Due to the gripping action of the cylinder and the fact that the peripheries of the cylinder and the roller were moving at the same rate of speed the slices did not slide but moved under the first roller and were fragmented by being compressed between the fixed surfaces. Some of the particles of the crushed potato immediately fell through the perforations in the cylinder. The remaining fragments of the crushed potato slices were squeezed through the perforations as the potato came in contact with the second roller. The riced potato was continuously discharged from the cylinder by the helical conveyor so that the rollers are always acting against open perforations. Hence, the back-pressure encountered in squeezing the crushed potato through the perforations was negligible and no difficulty was encountered with overloading the second roller.

In the preparation of dehydrated mashed potatoes it is important that the potato cells remain intact throughout the processing. If cells are broken, starch is liberated from them. When the dehydrated product is reconstituted, this "free-starch" gives the rehydrated product an undesirable pastiness not found to any great extent in a good mealy mashed potato. Differences in mealiness among mashed potato samples can be detected by a trained taste panel and such a panel has always chosen samples made by the new ricer as superior to samples made by existing mashing equipment.

A method exists, however, by which the amount of "free-starch" can be approximated by an objective, reproducible test. This is the "blue value" method of Mullins et al., "Estimation of Free Starch in Potato Granules and Its Relation to Consistency of Reconstituted Product," Food Technology, 1955, vol. IX, No. 8, pages 393–395, in which the amount of free-starch is reflected by the depth of color imparted to an iodine-potassium iodate solution. The more free-starch the more color develops; thus a high "blue value" indicates more free-starch and a low "blue value," less free starch.

In the following examples, two types of potato, a Russet of high solids content, exemplifying a "mealy" potato; and a Katahdin of low solids content, exemplifying a less mealy potato, were processed to potato flakes substantially as described by Willard and Cording in U.S. Patent No. 2,780,552 and Cording and Willard in U.S. Patent No. 2,759,832 and No. 2,787,553.

*Example 2*

Russet potatoes were peeled, trimmed, sliced, precooked and cooked. As the slices came from the cooker one half of the stream of slices was delivered to a standard screw-type extruder. The other half was delivered to the new ricer of the present invention. Each half was maintained distinct from the other and dehydrated to potato flakes on a single drum drier. "Blue values" were determined for the products.

|  | Screw-type Ricer | New Ricer |
|---|---|---|
| Blue Value of Flakes | 131 | 70 |

The "blue values" of these products in which the only variable was the method of ricing shows less free starch, hence less cell damage from the action of the new ricer.

*Example 3*

Katahdin, a low-solids type potato, was used in this example. The riced potatoes were dehydrated on a double drum drier. Otherwise the procedures were essentially those described in Example 2.

|  | Screw-type Ricer | New Ricer |
|---|---|---|
| Blue Value of Flakes | 257 | 150 |

Again there is a significant improvement in the quality of the product which was passed through the new ricer. In fact, potatoes of less mealy character, as the Katahdin, when riced with the new ricer, are brought within the same range of mealiness as the high-solids Russets which were riced with the screw-type ricer ("blue values" 150 versus 131).

We claim:

Apparatus for ricing cooked vegetables without rupturing their individual cells comprising a rotatable perforated hollow main cylinder; a plurality of rotatable solid rolls located peripherally with respect to said main cylinder and having their axes parallel thereto, the distances between said solid rolls and said main cylinder adjustably progressively decreasing in the direction of rotation of the main cylinder, said distances being such that the rolls farthest from the main cylinder apply only crushing forces to material between said rolls and said main cylinder but no forces sufficient to force material through the perforations in the main cylinder, the closest of said solid rolls substantially contacting said main cylinder; means for rotating the solid rolls at the same speed as the main cylinder but in a direction opposite to the rotation of said main cylinder whereby only crushing forces but no shearing forces are applied to material between said rolls and said main cylinder; and conveying means located within the main cylinder and communicating with the exterior thereof for removing riced vegetables.

References Cited in the file of this patent

UNITED STATES PATENTS

| 532,481 | Perky | Jan. 15, 1895 |
| 678,514 | Regnier | July 16, 1901 |
| 1,244,774 | Pointe | Oct. 30, 1917 |
| 1,327,254 | Remmers | Jan. 6, 1920 |
| 1,480,984 | Bell | Jan. 15, 1924 |
| 2,234,595 | Gano | Mar. 11, 1941 |
| 2,249,688 | Gano | July 5, 1941 |
| 2,345,779 | Wagner | Apr. 4, 1944 |
| 2,385,538 | Petzold | Sept. 25, 1945 |